(12) United States Patent
Slais

(10) Patent No.: US 6,328,073 B1
(45) Date of Patent: Dec. 11, 2001

(54) FLUID-TIGHT CONDUIT CONNECTION AND METHOD OF MAKING SAME

(75) Inventor: Robert J. Slais, West Bloomfield, MI (US)

(73) Assignee: Automotive Fluid Systems, Inc., Troy, MI (US)

( * ) Notice: Subject to any disclaimer, the term of this patent is extended or adjusted under 35 U.S.C. 154(b) by 0 days.

(21) Appl. No.: 09/334,320

(22) Filed: Jun. 16, 1999

Related U.S. Application Data

(60) Provisional application No. 60/095,687, filed on Aug. 7, 1998.

(51) Int. Cl.[7] ........................................... F16L 9/18
(52) U.S. Cl. ...................... 138/109; 138/110; 138/178; 29/523; 285/222; 285/286.2; 285/379; 285/382.5
(58) Field of Search .................................. 138/109, 110, 138/114, 178; 285/348, 379, 222, 382.4, 382.5, 286.1, 286.2, 330, 338; 29/523

(56) References Cited

U.S. PATENT DOCUMENTS

| | | |
|---|---|---|
| 2,332,682 | 10/1943 | Yelinek . |
| 3,018,547 | 1/1962 | Marskell . |
| 3,222,091 | 12/1965 | Marshall . |
| 3,667,785 | 6/1972 | Kapeker . |
| 3,778,090 | 12/1973 | Tobin . |
| 3,787,945 * | 1/1974 | Pasek et al. ............................ 29/523 |
| 3,860,742 * | 1/1975 | Medney ................................ 138/155 |
| 3,920,268 * | 11/1975 | Stewing ............................... 138/155 |
| 4,142,843 * | 3/1979 | Kish .................................. 285/382.4 |
| 4,279,435 * | 7/1981 | Alewitz ............................... 138/155 |
| 4,310,184 * | 1/1982 | Campbell ............................. 138/109 |
| 4,330,144 | 5/1982 | Ridenour . |
| 4,379,575 * | 4/1983 | Martin ................................ 285/382.7 |
| 4,450,618 * | 5/1984 | Ridenour ............................... 29/523 |
| 4,565,392 | 1/1986 | Vyse . |
| 4,593,448 * | 6/1986 | Aggradi et al. ........................ 29/523 |
| 4,622,732 * | 11/1986 | Broderick ............................. 29/523 |
| 4,667,989 * | 5/1987 | Bona ................................. 285/382.4 |
| 4,690,436 | 9/1987 | Hehl . |
| 4,768,275 * | 9/1988 | Schmitz ............................... 29/523 |
| 4,863,202 | 9/1989 | Oldford . |
| 4,919,461 | 4/1990 | Reynolds . |
| 5,092,634 * | 3/1992 | Miller ................................. 285/222 |
| 5,141,262 | 8/1992 | Bartholomew . |
| 5,310,227 | 5/1994 | Grinsteiner . |
| 5,338,071 | 8/1994 | Hohmann et al. . |
| 5,342,095 | 8/1994 | Koinger et al. . |
| 5,607,194 * | 3/1997 | Ridenour ............................. 285/382.4 |
| 5,845,945 * | 12/1998 | Carstensen ........................... 285/348 |
| 5,901,987 * | 5/1999 | Godeau .............................. 285/382.4 |

* cited by examiner

*Primary Examiner*—James Hook
(74) *Attorney, Agent, or Firm*—VanOphem & VanOphem, P.C.

(57) ABSTRACT

A body that slides over an end, opposite end, and outer diameter of a conduit is presented. A passage through the body has a groove in which a seal is located. A portion of the conduit is expanded to create an interference fit with the passage, groove, and ends of the body. As a result, an enlarged outer diameter of the conduit axially interlocks with the groove and compresses the seal therein to create a fluid-tight seal. In one embodiment of the present invention, a second enlarged outer diameter of the conduit is displaced outward over the opposite of the body to help lock the body to the conduit. Additionally, an outside diameter of the body can accommodate grooves for retaining seals. These seals can create a sealed engagement to a housing or another fitting, to form a complete conduit connection. The body can take the form of a housing, a male fitting, or a female fitting.

18 Claims, 5 Drawing Sheets

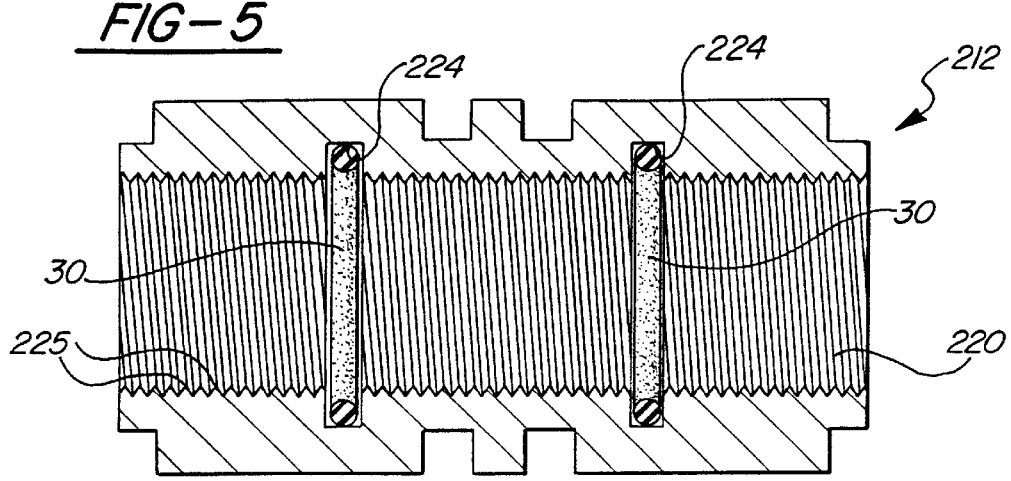
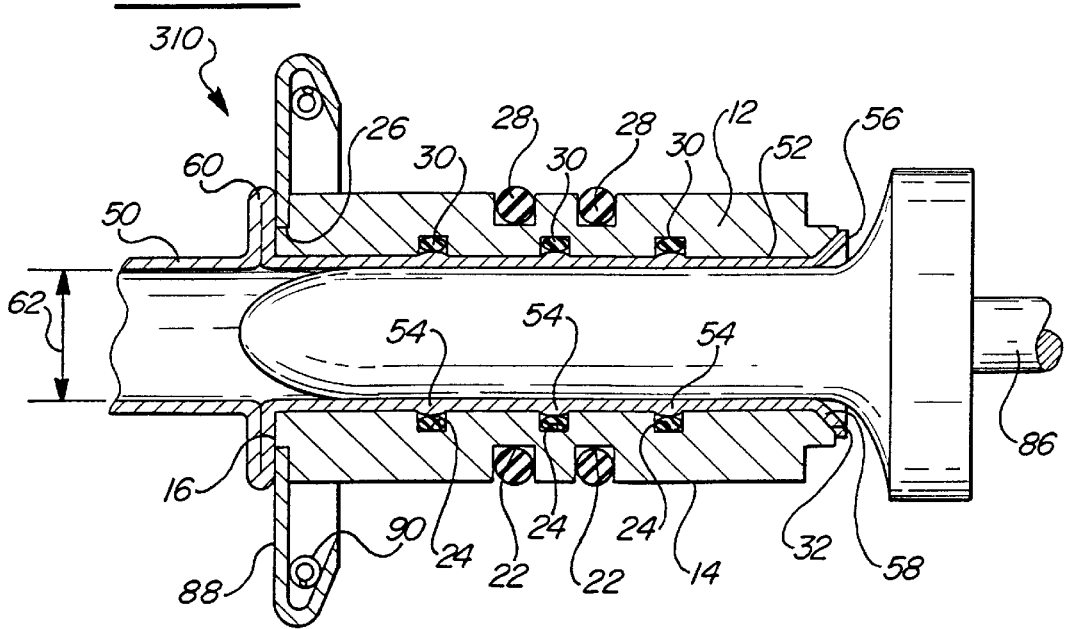

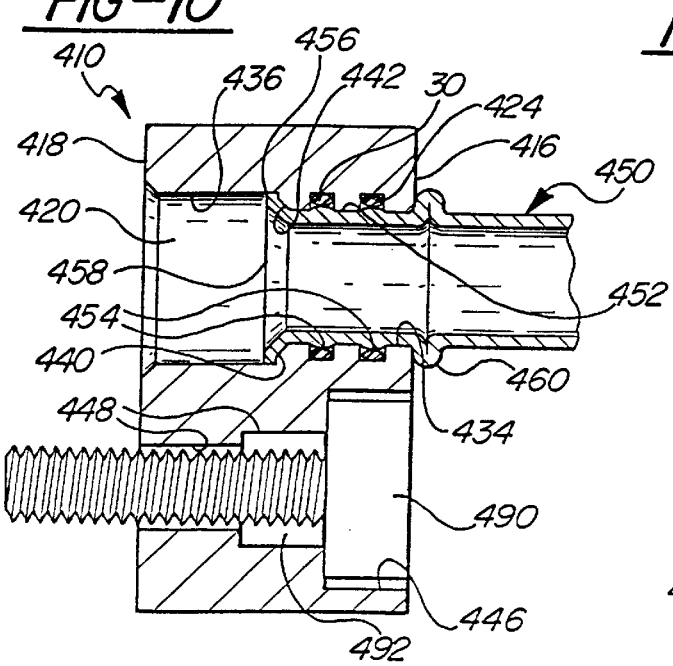
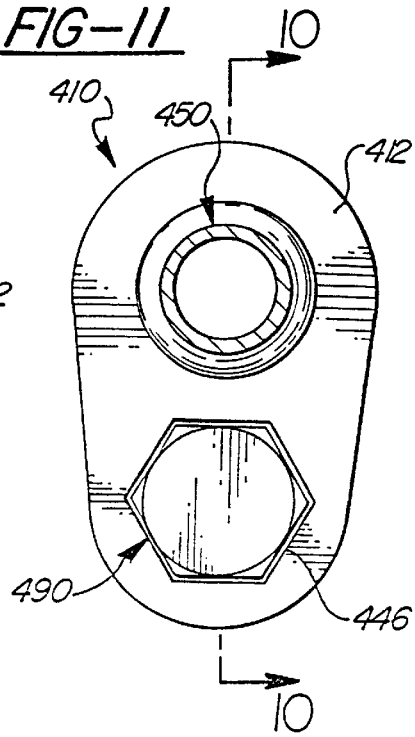
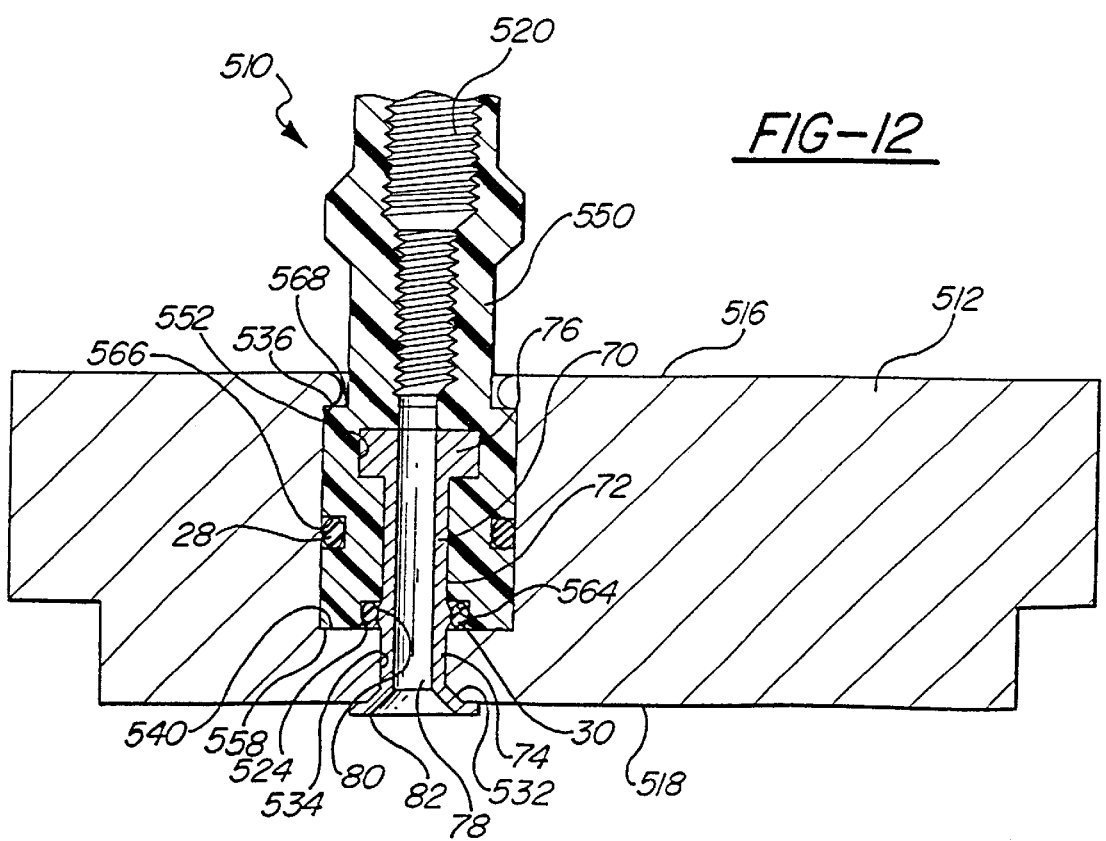

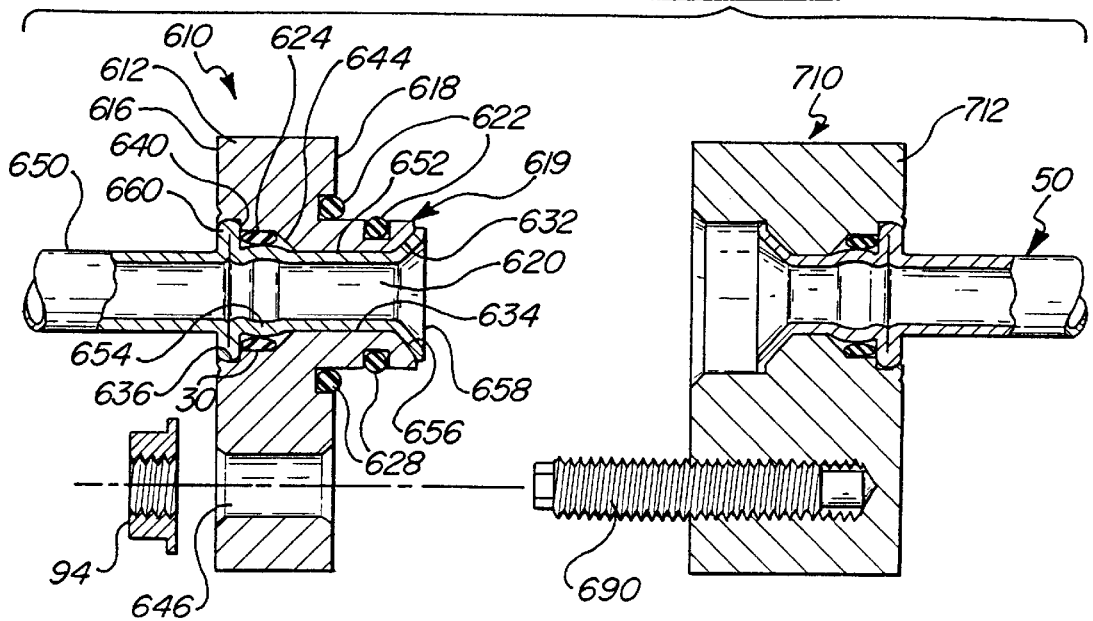
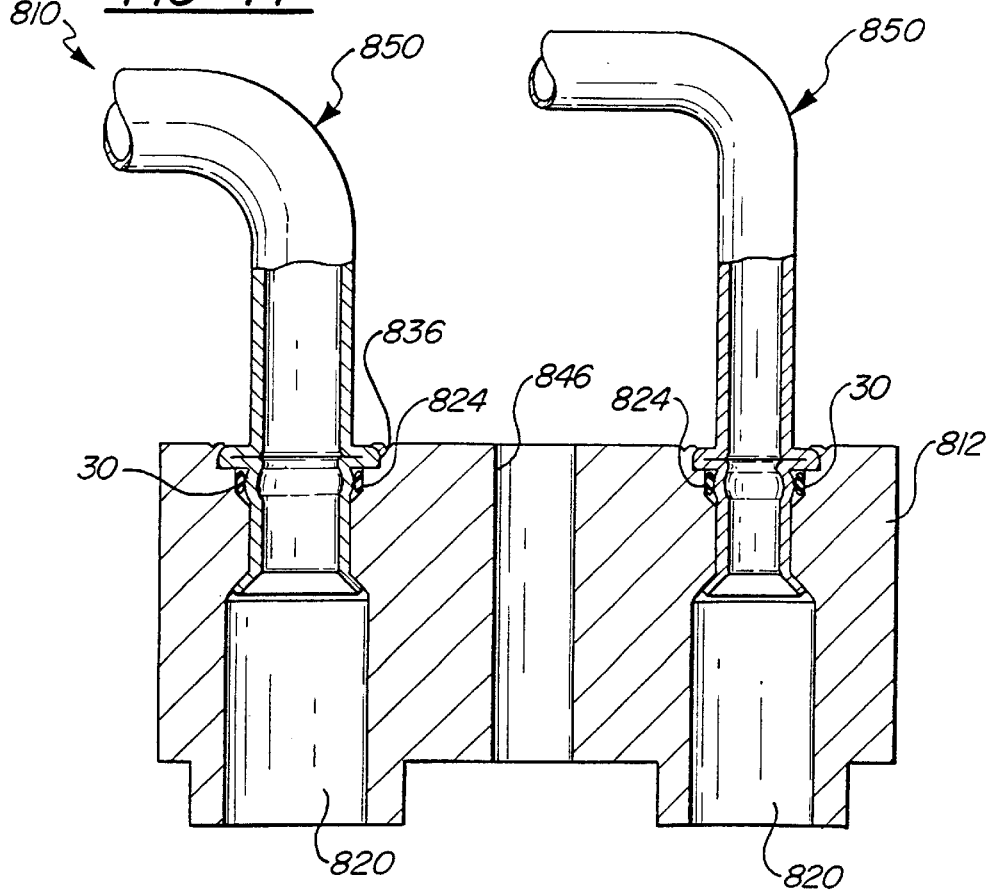

FLUID-TIGHT CONDUIT CONNECTION AND METHOD OF MAKING SAME

This application claims benefit to Provisional Application 60/095,687 Aug. 7, 1998.

BACKGROUND OF THE INVENTION

1. Field of the Invention

The present invention relates to conduit connections used in vehicular air-conditioning systems. Specifically, the present invention relates to a conduit connection that creates a fluid-tight seal and replaces conventional methods for end-forming conduit.

2. Description of the Prior Art

Presently known in the automotive air-conditioning art are many different ways to provide a connection between different conduits, or between conduits and another component, such as a compressor, accumulator, or the like. Such conduit connections must be highly reliable and virtually leak-free. In many conventional connection methods, sealing is accomplished using O-rings seated in grooves on the outer diameter of a conduit. To provide a proper seal, dimensional accuracy and stability must be ensured by processing the conduit end-form under strictly controlled manufacturing processes. Unfortunately, conventional end-forming processes often generate aluminum particle contamination. These sharp contaminants remain in the O-ring grooves, thereby cutting the O-rings and resulting in leakage.

Likewise, conventional end-forming processes require complicated, dedicated, and therefore very expensive tooling and equipment. Manufacturing each specific end-form detail of an aluminum conduit end requires constant quality control checks for equipment, raw materials, and manufacturing variations to avoid making parts that are outside of the allowed dimensional tolerances. Therefore, conventional end-forming can be a relatively slow and costly process.

Some relatively conventional end-forming methods of the prior art are disclosed in U.S. Pat. Nos. 4,863,202 to Oldford (hereafter '202) and 5,141,262 to Bartholomew (hereafter '262). These references are directed toward fitting-in-fitting novelty, unlike the present invention, which is directed to conduit-in-fitting novelty. The '202 reference discloses a connector assembly consisting of a first fitting including a body portion and a neck portion. The neck portion includes external grooves to receive O-rings. A second fitting has a bore therethrough for receiving the first fitting. One end of the second fitting bore has an internal groove for engaging one of the O-rings that is seated in one of the external grooves of the first fitting.

Similarly, the '262 reference discloses a connector assembly consisting of a first fitting including a body portion, a shoulder portion, and a neck portion. An O-ring circumscribes the neck portion and abuts the shoulder portion. A second fitting has a bore and counterbore therethrough, for receiving the neck, shoulder, and O-ring of the first fitting. The O-ring locates square against the bottom of the counterbore. Accordingly, in both the '202 reference and the '262 reference, the O-ring recess in the first fitting is exposed and potentially contaminated by particles generated during the end-forming process. Also, the recess in the second fitting potentially enables contaminants to create leak paths in the seal.

The following references are directed to conduit-in-fitting novelty, like the present invention; however, unlike the present invention, the following references require use of several intermediate fittings. Firstly, U.S. Pat. No. 5,342,095 (hereinafter '095) to Klinger et al. discloses a high pressure quick connector in which a conduit is enclosed within an intermediate metal retainer cap, intermediate metal retaining ring, and a body. The metal retainer cap, metal retaining ring, and body all have longitudinally extending bores for receiving the conduit. Further, O-rings circumscribe the conduit diameter and pilot in a reduced diameter of the body. Additionally, there is an O-ring spacer, a compression ring, and a spring. As in the '202 and '262 references, contaminants resulting from the end-forming process may create a potential for leakage.

Secondly, U.S. Pat. No. 4,919,461 to Reynolds discloses a pressure cylinder having a body, an insert fitting threadably engaged within the cylinder, and a pipe retained within the body by an intermediate pipe nut having a threaded connection with the insert fitting. An O-ring is retained in a groove in the insert fitting, piloting in a reduced diameter of the body.

Lastly, U.S. Pat. No. 5,310,227 to Grinsteiner discloses a conduit assembly including an intermediate compression fitting adjacent a seal, that in turn is adjacent a retainer ring. The sleeve, seal, and retainer ring are attached to a body conduit by an intermediate fitting threadably engaged to a fitting body.

Unfortunately, each of the above-mentioned references discloses a component made of a multitude of intermediate parts. The connectors in each of the above-mentioned references is held in place on a conduit by some type of threaded engagement, either directly with the insert, or among intermediate components surrounding the insert that are threadably engaged to each other.

Consequently, the prior art couplings described above are not optimal for use in a vehicular air-conditioning system because they have limited capability to withstand the harsh environment of the engine compartment. Conduit in a vehicular air-conditioning system is subject to extreme variations in temperature. In cold weather the couplings are subjected to temperatures ranging from as low as −40° F. (−55° C.) to around 260° F. (127° C.). In warm weather, temperatures under the hood can exceed 260° F. (127° C.). The multiple interconnections between the component couplings described above are not durable enough to withstand such temperature variations over extended periods of time. Each of the different components of the multiple component couplings have different expansion properties. Therefore, the retainer cap, retaining ring, and threaded nut required in the multiple component couplings are not reliable enough in a setting exposed to extreme temperature variations.

Furthermore, the couplings described above are also not suitable for the high pressure, harsh vibration conditions that exist under the hood of a car. The couplings described above connect two conduits to each other. They are not proper, however, for connecting conduits that are subject to high pressure, harsh vibrations, and extreme temperature variations where the multiple components are likely to be shaken apart or loosened due to the vibrations of the engine. The threaded connections relied on by the prior art couplings are simply more liable to fail in such a harsh environment due to leakage.

Accordingly, different types of solutions to the temperature and vibration problems associated with such devices have been proposed. For example, U.S. Pat. No. 3,778,090 to Tobin (hereinafter '090) discloses a thin walled beaded conduit connection for securing a conduit to a manifold block with an O-ring seal thereon. The conduit, extending through a counterbored aperture in the conduit block, is upset at one end to form an annular bead for axially locating the conduit to the block. Concurrently, the conduit is expanded to flow material into grooves circumscribed within the block aperture, for axially locking the conduit to the block. At a second surface, an O-ring encircles the conduit and pilots into a counterbore in the block. This second surface is then upset to form a second annular bead for axially compressing the O-ring and axially locking the block between the two annular upset beads.

Similar to the above patent is U.S. Pat. No. 5,092,634 to Miller (hereinafter '634). This reference is substantially similar to the '090 reference and is a connection for securing a conduit to a manifold block. This reference, however, incorporates a washer sandwiched between the second upset bead and the O-ring to improve O-ring compression and surface contact. Unfortunately, both of the above references are still susceptible to the problems of contamination. During the bead upsetting process the upset bead scrapes the counterbore of the body thereby generating contaminants. These contaminants cut into and degrade the O-rings that reside in the same counterbore, thereby leading to leaks and premature failure of the connection.

Alternatively, a further solution is proposed in U.S. Pat. No. 3,787,945 to Pasek et al. (hereinafter '945). This reference proposes providing a stepped bore in a conduit block, and inserting a thin walled conduit into a first surface of the stepped bore with an O-ring encircling the conduit. Moreover, this reference further proposes expanding the conduit within the stepped bore to compress the O-ring and axially locate the conduit against the step in the bore. Simultaneously, a second surface of the conduit is upset to form an annular bead to lock the block between the annular bead and expanded end of the conduit.

Therefore, the '945, '634, and '090 references all require use of several steps and design features to axially lock and seal the conduit to the block. Additionally, this prior art entraps the block to the conduit between two opposed enlarged diameters, or beads, in the conduit. Although this results in an initial positive axial entrapment, there are several problems. First, the upset beads are the weak link in the conduit because they undergo significant material deformation and over-compression in the fold of the bead. This deformation leads to conduit thinning and cracking in the bead. In turn, the thinning and cracking of the bead can lead to leaks resulting in premature conduit failure under harsh environmental conditions. Second, in addition to a thinned and cracked bead area, the conduit material is relatively soft and subject to harsh environmental forces. Therefore the bead strength that is relied upon for axial locking eventually gives way as the material "creeps," and results in an axially slack connection. This slack permits slight relative motion between the O-ring and the sealing surfaces, thereby leading to premature O-ring wear, failure, and leakage.

Finally, aside from all the prior art mentioned above, there are other conventional conduit end-forming methods generally known in the art. These methods involve time consuming, inaccurate manufacturing processes that result in parts with relatively large variances in dimensional tolerances. A closer tolerance between conduit and body can eliminate assembly O-ring seal defects such as side loading. One current method involves forming an upset bead on a conduit then inserting a connector block over a conduit end so that it abuts the bead and the conduit end extends a predetermined distance beyond the connector block. The conduit end undergoes a process that compresses the length of conduit that extends beyond the block from front to back. This compression encapsulates the inside and outside diameters of the conduit, and in turn, increases the wall thickness of the conduit, thereby creating a pilot. Then, the pilot is shaved during a secondary process that grips the conduit behind the connector block, thereby causing dimensional variances. Lastly, a shaver-cutting tool surrounds and machines the pilot and O-ring grooves.

Consequently, one problem experienced with this method is that the grip on the conduit is at such a distance from the pilot end that the conduit flexes, bends, and twists under pressure from the cutting tool. This flexing movement causes dimensional variations that can lead to a non-concentric end-form. As a result, the O-ring groove tends to be cut too deep, and when the conduit connection is made, the O-ring is pinched at one side causing decompression on the opposite side. The area of the O-ring that is not fully compressed is a leak path for refrigerant fluid. Throughout the life of the seal, small leaks can occur sporadically in the harsh automotive engine compartment that are difficult to trace, and lead to loss of refrigerant fluid.

Another problem is that the length of the cutting tool enables the tool to vibrate as it cuts, thereby leading to a defective end-form. The surface of the end-form gets marred and the O-ring groove may be irregularly shaped. These "chattering" defects, enable leaks under the extreme temperatures and pressures in an air-conditioning system.

What is needed is a fluid-tight conduit connection that has a minimum of design features and processing steps; is easily manufactured; has stable dimensional tolerances; and eliminates end-form defects associated with current end-forming technology, such as side load defects, chattering, and contamination. Further, what is needed is a fluid-tight conduit connection and associated method, where the connection is virtually integral between the parts being connected, and where the conduit is expanded to sealingly interlock the conduit to at least one recess in the body. Such a device will overcome the problems associated with multiple component connectors, contaminants generated during the end-forming process, and other defects associated with conventional conduit connection end-forming processes.

SUMMARY OF THE INVENTION

The present invention is directed to a conduit connection that satisfies the needs described above, as follows. The present invention has a body having a passage therethrough that in turn has at least one inner annular recess, such as a groove, counterbore, or countersink. The recess holds a seal, such as an O-ring. The body slides over the end of a conduit and the diameter of the conduit is expanded into the recess of the body to help lock the body to the conduit while compressing the seal. In one embodiment of the present invention, the conduit outer diameter is displaced outward at one end to axially engage the body and complete the axial locking of the body to the conduit. Additionally, the outside diameter of the body can accommodate grooves for retaining seals that create a sealed engagement for the conduit connection to a housing or the like.

There are at least two new advantages in radially expanding conduit into at least one seal-filled inner annular recess to sealingly interlock the body to the conduit. First, the problems in having to rely on upset beads to lock the conduit to the body are avoided. With the present invention, the upset bead may be preformed and need not be formed during assembly of the conduit to the body. Therefore, the counterbore remains free of seal damaging contaminants generated during the bead upsetting portion of assembly. Also, the upset bead is necessary only in one embodiment to provide axial location for the seal, and is not relied upon for axially locking the conduit to the body. Instead, a more robust axial lock is used with the present invention. The outside diameter of the conduit is expanded just slightly into at least one inner annular recess to trap the body to the conduit and compresses the seal therein. This results in a stronger conduit connection since only minimal material deformation takes place in contrast to the maximum material deformation in relying on dual upset beads for axial locking.

Second, interlocking the conduit to at least one recess within the body is more robust than the prior art method of entrapping the body between two beads on the conduit. Whereas entrapping the body between upset beads suffers the axial slack problem described above in the prior art, interlocking the body to the conduit via at least one recess avoids this problem. Again, the upset beads are relatively weak and susceptible to creep. Entrapping the body between the relatively long distance between weak upset beads, incorporates all the stretching and deformation of both beads. Over time, a relatively large amount of slack between the beads will develop. This slack will enable relative motion between the conduit and seal in which the conduit will wear away the seal and the connection will thereby leak.

In contrast, interlocking the body to the conduit via expanding the conduit outside diameter into at least one recess involves minimal deformation and is therefore much stronger. Therefore, only a relatively small amount of slack will develop over time, ensuring a fluid-tight connection.

Accordingly, it is an object of the present invention to provide a body that is sealingly retained on a conduit without including additional locking or retaining members, and without using expensive and wastefull brazing or welding processes.

It is a further object of the present invention to simplify the conduit end-forming process, while creating a tightly toleranced conduit connector.

It is yet a further object of the present invention to provide sealed interlocking engagement between the inside diameter of the body and the outside diameter of the conduit.

It is still a further object of the present invention to provide a contaminant-free fluid-tight connection by minimally interlocking the conduit into at least one recess in the body while compressing the seal therein.

It is another object of the present invention to provide a seal between the outside diameter of the body and the inside diameter of a housing attached to the outside diameter of the body forming a conduit connection.

It is yet another object of the present invention to provide the flexibility of making a standardized outer diameter for the body, relatively independent of the outer diameter of the tubing.

It is still a further object of the present invention to provide a method of manufacturing a body that meets all of the above stated objectives.

The invention will be described in detail with reference to the appended drawings. It should be pointed out the following description is intended to be a description of the preferred embodiment and is not exhaustive or limiting.

BRIEF DESCRIPTION OF THE DRAWINGS

FIG. 5 is a cross-sectional view of the body, in accordance with an embodiment of the present invention, in which the inner wall of the body is serrated, with O-rings seated in grooves;

FIG. 6 is a cross-sectional view of a spring-lock conduit connection shown during assembly using a flaring tool, in accordance with an embodiment of the present invention;

FIG. 10 is a cross-sectional view of a female "brazeless" block connection as taken along lines 10—10 of FIG. 11, in accordance with an embodiment of the present invention;

FIG. 11 is an end view of the female "brazeless" block connection of FIG. 10;

FIG. 12 is a cross-sectional view of a brazeless valve connection mounted to a machined top for a pressure vessel, in accordance with an embodiment of the present invention;

FIG. 13 is a partially exploded cross-sectional view of a male "peanut" block, and a female "peanut" block in accordance with the preferred embodiment of the present invention; and FIG. 14 is a cross-sectional view of a unified block connection using a unified connector block.

DETAILED DESCRIPTION OF THE PREFERRED EMBODIMENT

Figure 1:
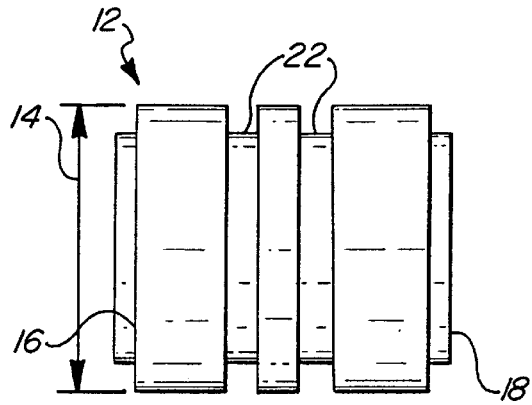
FIG. 1 is a side view of a body in accordance with an embodiment of the present invention.
Figure 2:
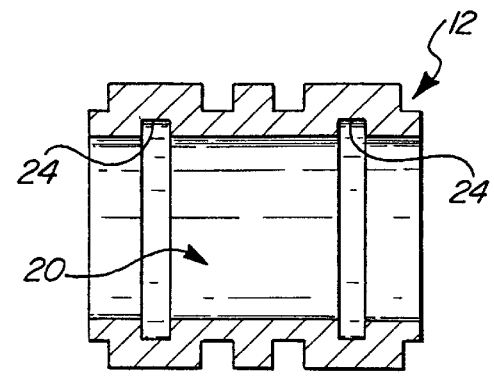
FIG. 2 is cross-sectional view of the body of FIG. 1.

Referring to FIG. 1 and FIG. 2 and according to the present invention, a body 12 such as an end-form insert, block connector, or housing is illustrated in side and cross-sectional views respectively. The body 12 includes an outer diameter 14, an end surface 16, an opposite end surface 13, and a passage 20 therebetween. The outer diameter 14 of the body 12 may include at least one outer groove 22. The passage 20 includes at least one inner annular recess such as an undercut groove or an inner groove 24, as well as a counterbore or countersink in one or both of the end surfaces, exemplified by FIGS. 13 and 14. It is preferable that the body 12 is symmetrical so that assembly is simplified and virtually error-proof.

Figure 3:
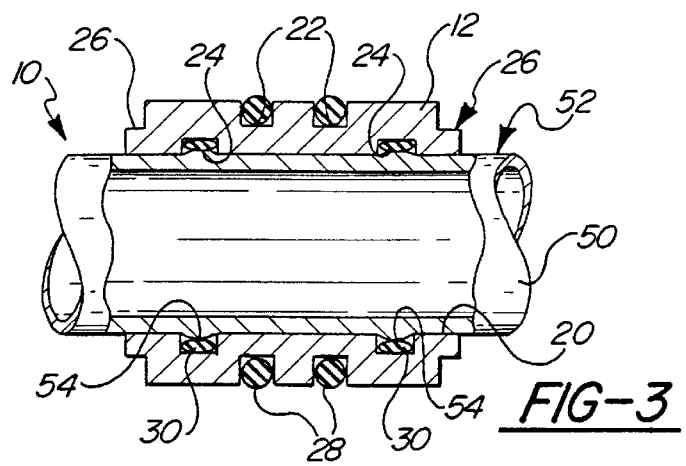
FIG. 3 is a cross-sectional view of a conduit connection using the body of FIG. 1, in accordance with an embodiment of the present invention.

Referring now to FIG. 3, a conduit connection 10 is illustrated in cross section. A stepped outer diameter 26 is located at each end of the body 12 and spaced a predetermined distance from the outer groove 22. The outer groove 22 holds an outer seal 28 for external sealing of the conduit connection 10. The inner groove 24 holds a resilient or inner seal member 30, such as an O-ring, for internal sealing of the conduit connection 10 as will be discussed hereinafter. As shown in cutaway view, a conduit 50, such as a tube, pipe, or hose, is positioned within the passage 20 of the body 12. The conduit 50 is expanded within the body 12 to engage an outer diameter 52 of the conduit 50 to the inner diameter of the passage 20 of the body 12 in diametral interference. This diametral interference will help prevent rotation and axial translation of the conduit relative to the body. Expanding the conduit 50 also displaces a portion of the conduit material slightly into the inner groove 24 at a projection or an enlarged outer diameter 54 of the conduit 50, and thereby radially compresses the inner seal member 30 and interlocks with the inner groove 24. Accordingly, the body 12 interlocks with and seals to the conduit 50, thereby forming a fluid-tight seal for the conduit connection 10.

Figure 4:
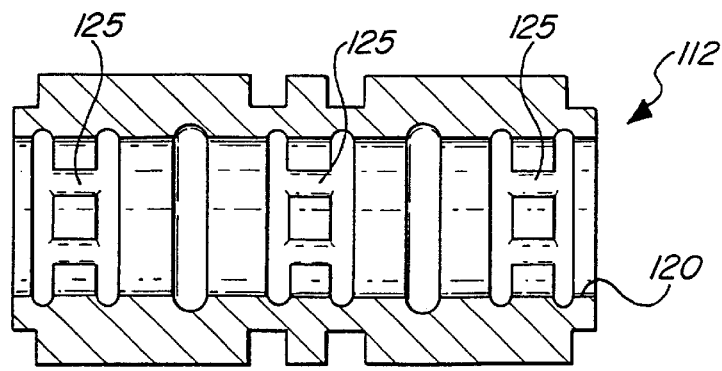
FIG. 4 is a cross-sectional view of a body, in accordance with an embodiment of the present invention, in which the inner wall of the body has both annular and axial grooves.

FIG. 4 illustrates an alternate embodiment of the present invention wherein an axially grooved body 112 incorporates at least one axial groove 125 in a passage 120 through the body 112. Conduit material is expanded into the axial groove 125 to interlock the body 112 to the conduit 50 (not shown), thereby also preventing rotational movement of the body 112 relative to the conduit 50.

FIG. 5 illustrates another embodiment of the present invention wherein a serrated body 212, is provided with annular serrations 225, such as threads, in a passage 220. In this alternate embodiment, the material of the conduit 50 (not shown) is expanded to interlock with the serrations 225. The serrations 225 provide mechanical interlocking between the conduit 50 and the serrated body 212. Among the serrations is at least one inner groove 224 that contains the inner seal member 30. As with the preferred embodiment, the inner groove 224 holds the inner seal member 30 and interlocks with the expanded material of the conduit 50 to provide an interlocking fluid-tight seal between the conduit 50 and the serrated body 212.

FIGS. 6 through 9 generally illustrate another embodiment of the present invention that is suitable for use as a ⅝" male spring-lock connection 310, a ½" male spring-lock connection 310', or a ⅜" male spring-lock connection 310". Referring now to FIG. 6, the end surface 16 of the body 12 mounts over an end 58 of the conduit 50, mounts over the outer diameter 52 of the conduit 50, and mounts squarely against an annular upset bead 60 formed in the conduit 50. The annular upset bead 60 is formed a predetermined distance from the end 58 of the conduit 50. When the annular upset bead 60 is formed, a small amount of oil remains on the outside of the conduit 50. When assembling the body 12 to the conduit 50, the oil is compressed creating a hydraulic seal that protects the inner seal member 30 from degradation.

The conduit 50 is expanded and sealingly interlocked to the body 12 by a special flaring tool 86. During assembly, the conduit connection 310 is supported at the end surface 16 of the body 12 by locating a back-up detail (not shown) behind the annular upset bead 60 of the conduit 50. Then, the flaring tool 86 is inserted in an inner diameter 62 of the conduit 50 at the end 58 of the conduit 50 to axially compress and radially expand a portion of the conduit 50 within the body 12 to communicate with the inner seal member 30. Axially compressing and radially expanding the conduit 50 acts to flow conduit material into the inner groove 24 and compress the inner seal member 30 at the enlarged outer diameter 54 of the conduit 50. The special flaring tool 86 also acts to flow conduit material into a countersink 32 at another portion or a second enlarged outer diameter 56 of the conduit 50. This helps to axially lock the body 12 securely to the conduit 50. The interference fit between the conduit 50 and the inner groove 24 combined with entrapment of the body 12 between the annular upset bead 60 and the second enlarged diameter 56, creates a stronger, more reliable connection between the conduit 50 and the body 12.

Finally, the body 12 may be securely and sealingly inserted into a female body such as a fitting, end cap, or housing (not shown). The female body may be retained by an annular cage 88 that is mounted on the stepped outer diameter 26 at the end surface 16 of the body 12 and spaced a distance from the end surface 16 of the body 12. The female body generally has a flared end (also not shown) that is retained within the annular cage 88. The annular cage 88 contains a spring 90 that engages the flared end of the female body as is commonly known in the art. To seal the connection between the outer diameter 14 of the body 12 and the female body, the outer seal 28 is seated in the outer groove 22 located on the outer diameter 14.

Figure 7:
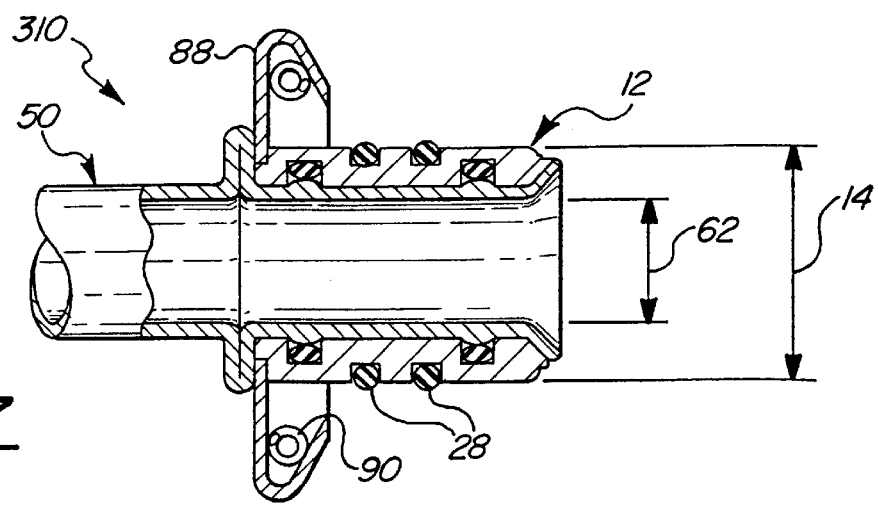
FIG. 7 is a cross-sectional view of the connection of FIG. 6 shown as assembled for a ⅝" to ¾" conduit.
Figure 8:
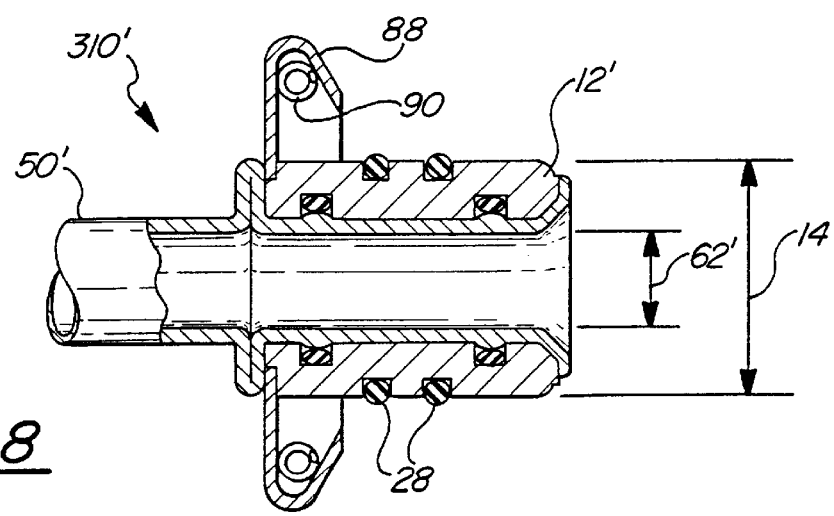
FIG. 8 is a cross-sectional view of a connection, in accordance with an embodiment of the present invention, and shown as assembled on a conduit for a ½" to ¾" conduit.
Figure 9:
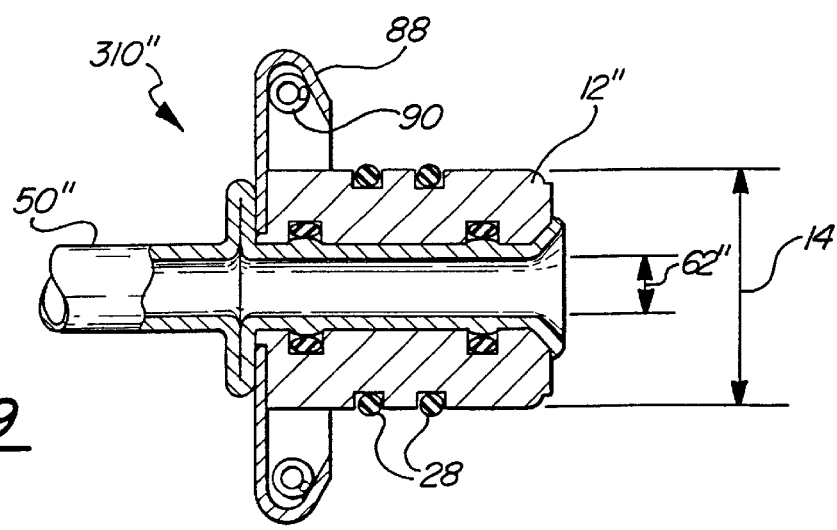
FIG. 9 is a cross-sectional view of a connection, in accordance with an embodiment of the present invention, shown as assembled on a conduit for a ⅜" to ¾" conduit.

Referring now to FIGS. 7 through 9, in a vehicular air-conditioning system conduits of varying size are used. In prior art conduit connections, multiple parts and components are required for each individual conduit size. In contrast, the body 12 of the present invention enables "one-size-fits-all" components, such as seals and caps, to be used on several different inserts having a common outer diameter, but different size inner diameters. This flexibility accommodates different conduit sizes, and greatly reduces the number of different components required in a conduit assembly. For example, the annular cage 88, spring 90, and outer seals 28 could be the same for each of several different lines of a common vehicular air-conditioning system. For example, FIG. 7 illustrates the ⅝" conduit connection 310 having the body 12 with the ⅝" to ¾" conduit 50 having an inner diameter 62. Secondly, FIG. 8 illustrates a ½" conduit connection 310' having a body 12' with a ½" to ¾" conduit 50' with an inner diameter 62'. Lastly, FIG. 9 illustrates a ⅜" conduit connection 310" having a body 12" with a ⅜" to ¾" conduit 50" with an inner diameter 62". In addition to the common outer diameter 14, the annular cage 88, the spring 90, the outer seals 28, and related tooling (not shown) are common components to each of the bodies 12 and can be used in any of the configurations shown in FIGS. 7 through 9.

FIGS. 10 through 11 show still another embodiment, where the present invention takes the form of a fluid-tight female brazeless block connection 410. As an example, a brazeless block style that is known in the art is shown; however, a variety of male and female conduit connection methods are compatible. FIG. 11 is an end view of a brazeless block connection 410 illustrating a brazeless connector block 412, a conduit 450, and a steel hex bolt 490 mounted inside a fastener passageway or hexagonal counterbore 446. FIG. 10 is a cross-sectional view of the female brazeless block connection 410 with the block 412 having an end surface 416, an opposite end surface 418, and a passage 420 therebetween.

The passage 420 has a throughbore 434 for receiving an end 458 of the conduit 450. The throughbore 434 has at least one inner groove 424 with the inner seal member 30 therein. As before, the conduit 450 is axially compressed and radially expanded within the block 412 using the special flaring tool 86 (not shown) to engage an outer diameter 452 of the conduit 450 to the passage 420. Expanding the conduit 450 also compresses the inner seal member 30 and displaces conduit material slightly into the inner groove 424 at an enlarged outer diameter 454 of the conduit 450. Accordingly, the block 412 interlocks and seals to the conduit 450, thereby forming the fluid-tight connection 410.

Additionally, the block 412 has a counterbore 436 in the opposite end surface 418 for receiving a male connector (not shown). The intersection of the throughbore 434 and the counterbore 436 define a bottom surface 440, or shoulder, of the counterbore 436. The bottom surface 440 has a countersink 442 concentric with the throughbore 434 and counterbore 436. The outer diameter 452 of the conduit 450 is also expanded into the countersink 442 to create a second enlarged diameter 456 in axial engagement with the bottom surface 440 of the counterbore 436, to further axially lock the conduit 450 to the block 412. Also, an upset bead 460 further helps axially lock the conduit 450 to the block 412.

The brazeless connector block 412 may be connected to a housing or a male connector block (not shown). To that end, the hexagonal counterbore 446 receives the steel hex bolt 490 for bolting the brazeless connector block 412 to a housing or other connector block (not shown). In this embodiment the hexagonal counterbore 446 consists of a series of reduced diameters 448. One of the series of reduced diameters 448 receives a nylon bushing 492, that creates an interference fit between the hexagonal counterbore 446 and the steel hex bolt 490, to prevent lateral movement of the steel hex bolt 490.

FIG. 12 shows still a fitter embodiment where the present invention can be used as a brazeless valve connection 510. The brazeless valve connection 510 is preferably made of injection molded nylon and has a molded conduit 550 and a passage 520 therethrough. FIG. 12 also shows a conduit sleeve 70 that is molded into the molded conduit 550. The conduit sleeve 70 is preferably made of aluminum and has an outer diameter 72, a stem 74 and a head 76. The head 76 of the conduit sleeve 70 is fully enclosed and the stem 74 protrudes from one end of the molded conduit 550. The conduit sleeve 70 has a passage 78 that communicates with the passage 520 in the molded conduit 550. The stem 74 of the conduit sleeve 70 will be used to help secure the brazeless valve connection 510 to a body, such as a pressure vessel top 512 or similar application.

The molded conduit 550 has an end 558, a counterbore 564 in the end 558 with an inner seal member 30 therein, and at least one outer groove 566 with the outer seal therein 28. An external shoulder 568 is spaced a predetermined distance from the end 558 and will be used to help lock the molded conduit 550 to the pressure vessel top 512.

FIG. 12 further shows the connection of the brazeless valve connection 510 to the pressure vessel top 512. The pressure vessel top 512 has a end surface 516, a opposite end surface 518, a counterbore 536 in the end surface, a countersink 532 in the opposite end surface, and a throughbore 534 in the opposite end surface 518 concentric to the counterbore 536 and countersink 532. The intersection of the counterbore 536 and the throughbore 534 define a bottom surface, or shoulder 540, of the counterbore 536. The brazeless valve connection 510 locates in the counterbore 536 against the shoulder 540 and is sealingly interlocked to the body 512, as in the previous embodiments.

An enlarged outer diameter 80 of the conduit sleeve 70 is expanded into a groove 524 defined by the boundaries of the counterbore 564 of the molded conduit 550 and the shoulder 540 of the counterbore 536. A second enlarged outer diameter 82 of the conduit sleeve 70 is also expanded into the countersink 532 at the opposite end surface 518 of the pressure vessel top 512. Expanding the conduit sleeve outer diameter 72 into these recesses axially locks the molded conduit 550 and conduit sleeve 70 to the pressure vessel top 512. Simultaneously, the conduit sleeve outer diameter 72 compresses the inner seal member 30 to create fluid-tight sealing among the molded conduit 550, the conduit sleeve 70, and the pressure vessel top 512. Also, the material of the pressure vessel top 512 can be staked over the external shoulder 568 in the molded conduit 550 for attachment to the pressure vessel top 512.

FIG. 13 illustrates yet another embodiment of the present invention where a set of male and female "peanut block" connections is shown in cross section. For example, a ⅝" to ¾" dual plane seal tubular connection is shown, but a variety of tubular connection sizes and styles are compatible with the present invention. FIG. 13 depicts both a male peanut block connection 610 and a female peanut block connection 710 in an exploded cross-sectional view. A male peanut block 612 has a end surface 616, a opposite end surface 618, a passage 620 therebetween, and an extension 619 protruding out of the end surface 618.

The male peanut block 612 has a first counterbore 636 in the end surface 616, a second counterbore 624 in a bottom surface 640 of and concentric with the first counterbore 636, with the inner seal member 30 disposed therein. The male peanut block 612 further has a concentric countersink 644 connecting the second counterbore 624 with a concentric throughbore 634, and finally has a second countersink 632 concentric with the throughbore 634 in the opposite end surface 618. The end 658 of a conduit 650 fully extends through the passage 620, and protrudes beyond the end of the extension 619. An annular upset bead 660 locates against the bottom surface 640 of the counterbore 636 in the end surface 616 of the male peanut block 612. The conduit 650 is then expanded within the male peanut block 612 to engage an outer diameter 652 of the conduit 650 to the passage 620. Expanding the conduit into the inner seal member 30 occupied second counterbore 624 sealingly interlocks the male peanut block 612 to the countersink 644 at an enlarged outer diameter 654 of the conduit 650. Concurrently, the conduit 650 is expanded at the opposite end surface 618 of the male peanut block 612 to interlock a second enlarged diameter 656 to the second countersink 632.

The male peanut block 612 is also axially locked to the conduit 650 by coining the end surface 616 male peanut block 612 into the annular upset bead 660 radially adjacent to the annular upset bead 660. As the conduit 650 is expanded and coined, the annular upset bead 660 is compressed front to back by conduit clamp jaws (not shown), that compress the diameter of the annular upset bead 660, fitting it tightly into the counterbore 636. As the male peanut block 612 is compressed against clamp jaws by the flare tool 86 (not shown), a machined male coining detail (not shown) in the clamp jaws coins the end surface 616 of the male peanut block 612 radially adjacent to the counterbore 636. Consequently, this process flows material from the male peanut block 612 into the annular upset bead 660 to secure the assembly. A bolt passage 646 of the male peanut block 612 receives a bolt 690 for attaching the male peanut block 612 to an accumulator or other device, such as a female peanut block 712, via a nut 94.

Sealing the connection between the male peanut block 612 and another mating member, such as the female peanut block 712, is accomplished using outer annular grooves 622 with seals 628 therein. When the male and female peanut block connections, 610 and 710 respectively, are assembled, a bolt 690 is received by the bolt passage 646. A nut 94 is threaded on the bolt 690 thereby torquing the connections together. As the male to female connection is made, compressing the seals completes the seal.

FIG. 14 illustrates an embodiment that is nearly identical with the previous "peanut block" connection of FIG. 13. This is an embodiment of the present invention shown as a unified block connection 810, having a unified block 812 with at least two passages 820. These passages 820 are provided to receive a conduit 850. A counterbore 836 is provided in each of the passages. As before, the conduit 850 is expanded into an inner annular recess 824 occupied by the inner seal member 30 to sealingly interlock the unified block 812 to the conduit 50. A bolt passage 846 is adapted to receive a bolt (not shown) for fastening to another body (also not shown).

The embodiments of FIGS. 1 through 12 illustrate a method of making the conduit connection that involves mounting the body over the end and outer diameter of the conduit. Further, the method of manufacture involves axially compressing and radially expanding the conduit within the body to sealingly interlock the enlarged diameter of the conduit into a recess, such as a inner groove occupied by the inner seal, thereby compressing the inner seal and creating a fluid-tight seal and axial lock. As a secondary measure, this method may involve expanding the second enlarged diameter of the conduit into another recess, such as the countersink, to further axially lock the body to the conduit. The conduit can be axially compressed and radially expanded into the body using the flaring tool.

Similarly, the embodiments of FIGS. 13 and 14 illustrate exactly the same method as described above, with one variation. The success of this method depends not only on sealingly interlocking the enlarged outer diameter to the body, but also necessarily depends on interlocking the second enlarged outer diameter to a recess such as a countersink of the body. Otherwise, the embodiments involve the same process—axially compressing and radially expanding the conduit to interlock at least one enlarged outer diameter of the conduit to the body and simultaneously compressing the inner seal within the inner groove to help sealingly interlock the body to the conduit.

An advantage of the present invention is that the finished connection has greater strength and stability. Unlike the other conventional methods described in the prior art section, the conduit of the present invention need not undergo extensive end-forming operations. Manufacturing tolerances for the interference between the conduit and the body can vary from 0.001" to 0.010" without affecting the strength of the finished part. The body is capable of being pre-qualified before assembly. Gauging can be used to ensure the part is of proper dimensional tolerances before it is assembled to a conduit in a production setting.

Another advantage of the present invention is that manufacturing and assembly costs are reduced by eliminating the need for multiple parts such as retaining rings, caps, threaded nuts, and seals (see discussion of FIGS. 6–9). Also, multiple in-process quality checks are not required because the body can be pre-qualified, resulting in cost savings due to simplified assembly and quality checks.

The body of the present invention can be a machined, molded, or cast component. The body is made prior to the assembly of the conduit, and therefore can be held to more precise manufacturing tolerances than current end-forming processes that are performed as the conduit is assembled.

Yet another advantage of the body of the present invention is the simplicity of the body. There is no need for multiple parts as in the prior art bodies disclosed in the '202, '212, and '262 references discussed above that require a retainer cap, retaining ring, and threaded nut to hold the assembly to a conduit end.

Still another advantage of the end-form body of the present invention is the capability of maintaining a standard dimension for the outer diameter of the body while having varying internal diameter dimensions; which permits standard size components to be used for each application of the body.

A further advantage in the simplicity of the present invention is the capability of mass producing bodies cost effectively yet with high reliability and durability, with far less variation in dimensional tolerances of the conduit connection than the prior art. More than one body can be run with the same tooling. The body can be produced on a press where ram distance and diameter adjustments are the only variable. The same punches and jaws can be used to produce bodies for a variety of applications. This is a very cost effective means of producing a variety of high quality end-forms in a reliable manner.

Yet a further advantage of the present invention is that the body can be reused if the conduit is damaged. The conduit can be removed from the body by drilling out the conduit or removing the expanded end. The body is the most expensive part of the connection, but remains unaffected by the removal and can be reused. Because there is no costly end-forming operation needed to prepare grooves in the conduit as in prior art methods, the cost associated with replacing the beaded conduit is minimal. The conduit cannot be salvaged for reuse, but the material can be recycled, thus increasing the savings.

Still a further advantage of each of the embodiments of the present invention is that all of the conduit connections are brazeless. Brazing is an expensive manufacturing process that is difficult to control and creates quality problems. The brazing process also uses many consumable products such as inert gas, filler rod, and cleaning solution that produces flumes and gaseous expulsions that are toxic to the atmosphere of the manufacturing facility. The brazeless technology of the present invention will allow easier processing, lower cost and improved quality over conventional methods requiring brazing.

Although particular embodiments of the present invention have been illustrated in the accompanying drawings and described in the foregoing detailed description, it is to be understood that the present invention is not to be limited to just the embodiments disclosed. Rearrangements, modifications, and substitutions are possible without departing from the scope of the claims that are appended hereto.

What is claimed is:

1. A fluid-tight connection, comprising:
    a block connector body having a passage therethrough, said passage having at least one groove therein, said block connector body further having an external second groove;
    a fist resilient seal member placed in said at least one groove of said block connector body for sealing said fluid-tight connection and a second resilient seal member located in said external second groove;
    a conduit being mounted in said passage of said block connector body; and
    means for expanding a portion of said conduit into said at least one groove of said block connector body, said means for expanding being in radial compression with said first resilient seal member to further seal said fluid-tight conduit connection, further said expanding means being interlocked with said at least one grove to further axially locate said conduit relative to said block connector body.

2. The fluid-tight conduit connection of claim 1, wherein said conduit has an outer diameter thereon, said expanding means includes said outer diameter of said conduit in diametral interference with said passage of said block connector body to prevent rotation and axial translation of said conduit relative to said block connector body.

3. The fluid-tight conduit connection of claim 2, wherein said passage of said block connector body further has annular serrations therein, said expanding means further includes said outer diameter of said conduit interlocked with said annular serrations to prevent rotation and axial translation of said conduit relative to said block connector body.

4. The fluid-tight conduit connection of Claim 2, wherein said passage of said block connector body further has annular serrations therein, said expanding means further includes said outer diameter of said conduit interlocked with said annular serrations to prevent rotation and axial translation of said conduit relative to said block connector body.

5. A conduit and body connection, comprising:
a body having a passage therethrough said passage having at least one internal groove therein, said body further having at least one external groove therein;
a first resilient seal member being placed in said at least one internal groove of said passage of said body and a second resilient seal member being placed in said at least one external groove; and
a conduit being mounted in said passage of said body, said conduit having an enlarged outer diameter portion thereon, said enlarged outer diameter portion being in radial compression with said first resilient seal member and being interlocked with said at least one internal groove of said body, to create a fluid-tight seal between said conduit and said body and to axially locate said conduit relative to said body.

6. The conduit and body connection as claimed in claim 5, wherein said body further has an end surface and an opposite end surface opposite of said end surface, with said passage extending therebetween, said conduit further has an end and an annular upset bead thereon, said annular upset bead is positioned against said end surface of said body and is axially spaced from said end of said conduit.

7. The conduit and body connection as claimed in claim 6, wherein said end of said conduit extends past said opposite end surface of said body, said end of said conduit is displaced about said opposite end surface of said body, whereby said body is sandwiched between said end and said annular upset bead of said conduit to further lock said conduit to said body.

8. The conduit and body connection as claimed in claim 7, wherein said passage of said body further has a counterbore in said opposite end surface of said body, said counterbore has a bottom surface located between said end surface and said opposite end surface of said body, said bottom surface has a countersink therein, said end of said conduit extends into said counterbore, further said end of said conduit is displaced about said countersink, whereby said body is sandwiched between said end and said annular upset bead of said conduit to further lock said conduit to said body.

9. The conduit and body connection as claimed in claim 8, wherein said body further has a fastener passageway parallel to said passage and spaced away therefrom to enable use of a fastener for fastening said body.

10. A conduit and body connection, comprising:
a body having an end surface and an opposite end surface opposite said end surface, said end surface having a counterbore therein, said opposite end surface having a throughbore therein, said throughbore being concentric to and communicating with said counterbore, further said throughbore intersecting said counterbore thereby defining a shoulder therebetween, said throughbore having a countersink in said opposite end surface;
a molded conduit being mounted in said counterbore of said body, said molded conduit having an end being located against said shoulder of said body, said molded conduit further having a counterbore in said end, further said counterbore and said shoulder of said body thereby defining a groove therebetween, said molded conduit further having a passage therethrough, said passage having an enlarged recess therein;
a conduit sleeve being mounted within said passage of said molded conduit, said conduit sleeve having a head portion thereon, said head portion occupying said enlarged recess of said molded conduit thereby interlocking said conduit sleeve to said molded conduit, said conduit sleeve further having an enlarged outer diameter thereon and further having a second enlarged outer diameter thereon; and
means for sealingly interlocking said enlarged outer diameter and said second enlarged outer diameter of said conduit sleeve to said body, thereby creating a fluid-tight seal among said molded conduit, said conduit sleeve, and said body.

11. The conduit and body connection of claim 10 wherein said means for sealingly interlocking comprises:
a seal member placed in said counterbore of said molded conduit;
said enlarged outer diameter of said conduit sleeve expanded into said groove and in radial compression with said seal member to form a first axial interference; and
said second enlarged outer diameter of said conduit sleeve expanded into said countersink of said body to form a second axial interference, whereby said first and second axial interferences axially lock said molded conduit to said body, further said enlarged outer diameter of said conduit sleeve in compression with said seal member to create a fluid-tight seal among said conduit sleeve, said body, and said molded conduit.

12. A fluid-tight conduit and body connection, comprising:
a block connector body having an end surface, an opposite end surface, and at least one passage therethrough, said at least one passage having a counterbore in said end surface;
a resilient seal member being placed in said counterbore of said block connector body for sealing said fluid-tight conduit connection; and
a conduit being mounted in said at least one passage of said block connector body, said conduit having an enlarged outer diameter thereon, said enlarged outer diameter being in radial compression with said resilient seal member and being interlocked with said counterbore of said block connector body to further seal said fluid-tight conduit and body connection and form an axial interference between said conduit and said block connector body.

13. The fluid-tight conduit and body connection of claim 12, wherein said at least one passage of said block connector body further has a countersink in said opposite end surface, said conduit further has a second enlarged outer diameter thereon, further wherein said second enlarged outer diameter of said conduit interlocks with said countersink and forms a second axial interference with said block connector body to further axially locate said conduit relative to said block connector body.

14. The fluid-tight conduit and body connection of claim 13, wherein said at least one passage of said block connector body further has another counterbore in said end surface of said block connector body, said conduit further has an annular upset bead mounted within said another counterbore to further axially lock said conduit to said block connector body, whereby said block connector body is sandwiched between said second enlarged outer diameter and said annular upset bead of said conduit.

15. The fluid-tight conduit and body connection of claim 14, wherein said block connector body further has a bolt hole therethrough, said at least one passage of said block connector body further has a counterbore located in said opposite end surface of said block connector body, said countersink is further located in the bottom of said counterbore in said opposite end surface.

16. A method of a fluid-tight conduit connection, said method comprising the steps of:
   providing a body having a passage therethrougb, said passage having at least one groove therein;
   providing at least one external groove on said body;
   placing a first resilient seal member in said at least one groove of said body, for sealing said fluid-tight conduit connection;
   placing a second resilient seal member in said at least one external groove of said body;
   mounting a conduit in said passage of said body; and
   expanding a portion of said conduit into said at least one groove of said body, thereby compressing said resilient seal member to further seal said fluid-tight conduit connection, further thereby interlocking said portion of said conduit with said at least one groove to axially locate said conduit relative to said body.

17. The method of claim 16, wherein said expanding step further comprises inserting a tool into said conduit and axially compressing said conduit with said tool until said portion of said conduit flows into said at least one groove.

18. The method of claim 16, wherein said providing step includes said body having an end surface and further includes said passage having a countersink in said end surface, further wherein said expanding step includes expanding another portion of said conduit into said countersink to further axially locate said conduit relative to said body.

* * * * *

UNITED STATES PATENT AND TRADEMARK OFFICE
CERTIFICATE OF CORRECTION

PATENT NO. : 6,328,073 B1
DATED : December 11, 2001
INVENTOR(S) : Slais

It is certified that error appears in the above-identified patent and that said Letters Patent is hereby corrected as shown below:

Column 2,
Line 41, after "-40° F", kindly delete the period ".".
Line 42, after "-55° C", kindly delete the period ".".
Line 42, after "260° F", kindly delete the period ".".
Line 42, after "127° C", kindly delete the period ".".
Line 43, after "260° F", kindly delete the period ".".
Line 43, after "127° C", kindly delete the period ".".

Column 4,
Line 3, after "conduit", kindly delete the comma ",", and insert a comma -- , -- after "and".
Line 26, after "defects", kindly delete the comma ",".
Line 29, after "steps", kindly delete the semi-colon ";", and insert a comma -- , --.
Line 30, after "manufactured", kindly delete the semi-colon ";", and insert a comma ",".
Line 30, after "tolerances", kindly delete the semi-colon ";", and insert a comma -- , --.

Column 6,
Line 45, after "surface", kindly delete "13" and insert -- 18 --.

Column 7,
Line 17, after "212", kindly delete the comma ",".
Line 64, after "56", kindly delete the comma ",".

Column 9,
Line 18, kindly delete "fitter" and insert -- further --.
Line 42, kindly delete "a" and insert -- an --.
Line 42, after "516,", kindly delete "a", and insert -- an --.

Column 10,
Line 9, after "has", kindly delete "a", and insert -- an --.
Line 9, after "616,", kindly delete "a", and insert -- an --.
Line 42, kindly delete "flare", and insert -- flaring --.
Line 57, kindly delete "a", and insert -- the --.

Column 11,
Line 3, kindly delete "50", and insert -- 850 --.
Line 12, after "as", kindly delete "a", and insert -- an --.

UNITED STATES PATENT AND TRADEMARK OFFICE
CERTIFICATE OF CORRECTION

PATENT NO. : 6,328,073 B1
DATED : December 11, 2001
INVENTOR(S) : Slais

It is certified that error appears in the above-identified patent and that said Letters Patent is hereby corrected as shown below:

Column 12,
Line 29, kindly delete "flumes", and insert -- fumes --.
Line 59, kindly delete "grove", and insert -- groove --.

Column 13,
Line 14, after "therethrough", kindly insert a comma -- , --.

Column 14,
Line 41, after "surface", kindly delete the colon ":", and insert a semicolon -- ; --.

Column 15,
Line 11, after "of", kindly insert -- making --.
Line 13, kindly delete "therethrougb", and insert -- therethrough --.

Signed and Sealed this

Fifteenth Day of April, 2003

JAMES E. ROGAN
*Director of the United States Patent and Trademark Office*